United States Patent [19]

Evans et al.

[11] Patent Number: 5,721,315
[45] Date of Patent: Feb. 24, 1998

[54] POLYETHER AMINE MODIFICATION OF POLYPROPYLENE

[75] Inventors: Randall Keith Evans, Houston; Richard Joseph Gilbert Dominguez; Richard James Clark, both of Austin, all of Tex.

[73] Assignee: Huntsman Petrochemical Corporation, Austin, Tex.

[21] Appl. No.: 515,706

[22] Filed: Aug. 16, 1995

Related U.S. Application Data

[60] Continuation of Ser. No. 222,508, Apr. 4, 1994, abandoned, which is a division of Ser. No. 90,675, Jul. 13, 1993, abandoned.

[51] Int. Cl.$^6$ .................................................. C08L 51/06
[52] U.S. Cl. ........................... 525/74; 525/78; 525/80; 525/374; 525/379
[58] Field of Search ......................... 525/70, 74, 374, 525/379, 78, 80

[56] References Cited

U.S. PATENT DOCUMENTS

| | | | |
|---|---|---|---|
| 3,320,226 | 5/1967 | Cappuccio et al. | 525/180 |
| 3,654,370 | 4/1972 | Yeakey | 564/480 |
| 4,039,461 | 8/1977 | Hankins et al. | 252/51.5 A |
| 4,137,185 | 1/1979 | Gardiner et al. | 252/33 |
| 4,179,164 | 12/1979 | Lausberg et al. | 525/179 |
| 4,505,834 | 3/1985 | Papay et al. | 252/51.5 A |
| 4,520,171 | 5/1985 | Diveley et al. | 525/279 |
| 4,632,769 | 12/1986 | Gutierrez et al. | 252/48.6 |
| 4,636,436 | 1/1987 | Clementini et al. | 428/364 |
| 4,678,834 | 7/1987 | Boivin et al. | 525/74 |
| 4,710,540 | 12/1987 | McAlpin et al. | 525/101 |
| 4,753,997 | 6/1988 | Shyu et al. | 525/259 |
| 4,795,782 | 1/1989 | Lutz et al. | 525/66 |
| 4,822,688 | 4/1989 | Nogues | 525/66 |
| 4,857,595 | 8/1989 | Kazmierzak et al. | 525/375 |
| 4,861,812 | 8/1989 | McAlpin | 524/3 |
| 4,902,749 | 2/1990 | Akkapeddi et al. | 525/66 |
| 4,952,631 | 8/1990 | McAlpin et al. | 525/101 |
| 4,981,896 | 1/1991 | Okada et al. | 524/413 |
| 4,994,503 | 2/1991 | Harris et al. | 525/459 |
| 5,006,601 | 4/1991 | Lutz et al. | 525/66 |
| 5,010,119 | 4/1991 | McElrath, Jr. et al. | 523/205 |
| 5,073,600 | 12/1991 | Gorman et al. | 525/264 |
| 5,115,018 | 5/1992 | Akkapeddi et al. | 525/64 |
| 5,208,081 | 5/1993 | Gübitz et al. | 428/31 |
| 5,210,134 | 5/1993 | Akkapeddi et al. | 525/64 |
| 5,225,483 | 7/1993 | Datta et al. | 525/74 |
| 5,244,971 | 9/1993 | Jean-Marc | 525/64 |
| 5,346,951 | 9/1994 | Suwada | 525/64 |
| 5,364,909 | 11/1994 | Guo et al. | 525/69 |
| 5,369,170 | 11/1994 | Weinkauf | 525/64 |
| 5,373,048 | 12/1994 | Witzeman et al. | 524/458 |
| 5,384,375 | 1/1995 | Roberts | 525/327.6 |
| 5,393,824 | 2/1995 | Roberts | 524/531 |

FOREIGN PATENT DOCUMENTS

| | | |
|---|---|---|
| 1184554 | 3/1985 | Canada . |
| 0061889 | 10/1982 | European Pat. Off. . |
| 0 367 832 A1 | 5/1990 | European Pat. Off. . |
| 46-003838 | 1/1971 | Japan . |
| 60195120 | 3/1984 | Japan . |
| 7-53812 | 2/1995 | Japan . |
| 02156364 | 10/1985 | United Kingdom . |
| 2156364 | 10/1985 | United Kingdom . |
| WO 93/24938 | 12/1993 | WIPO . |

OTHER PUBLICATIONS

Callais & Kazmierzak, "The Maleic Grafting of Polypropylene With Organic Peroxides", *Compalloy '90*, pp. 361–369, (1990).

Asahi Kasei Kogyo KK, "Amino gp–contg polypropylene resin compsn comprising crystalline polypropylene and prim amino–contg modified polypropylene," Orbit Abstract of JP–07–053812–A dated Feb. 28, 1995.

Derwent Abstract of JP 2237943, Sep. 1990.

S.S. Dagli, et al. *Process Requirements of the Reactive Compatibilization of Nylon 6/Polypropylene Blends:* Polymer Processing Institute at Stevens Institute of Technology, Hoboken, NJ.

*Primary Examiner*—Mark L. Warzel
*Attorney, Agent, or Firm*—Russell R. Stolle; Ron D. Brown; Robert M. O'Keefe

[57] ABSTRACT

A compound comprising a blend of polypropylene with the reaction product of a functionalized polypropylene and polyether amine in which the polyether amine is grafted onto the functionalized polypropylene in a customary mixing apparatus is disclosed. A process for producing the reaction product of the functionalized polypropylene and the polyether amine by melting with polypropylene in a customary mixing apparatus is also disclosed.

24 Claims, No Drawings

POLYETHER AMINE MODIFICATION OF POLYPROPYLENE

This application is a continuation of application Ser. No. 08/222,508, filed Apr. 4, 1994, now abandoned, which is a divisional of application Ser. No. 08/090,675, filed Jul. 13, 1993, now abandoned.

BACKGROUND OF THE INVENTION

1. Field of the Invention

This invention relates to a novel olefin polymer composed of the reaction product of a functionalized polypropylene and a polyetheramine. This invention also relates to thermoplastic resin blends containing the novel olefin polymer and polypropylene.

2. Related Art

The in-situ formation of compatibilizers for polyblends is rapidly gaining popularity. In the last few years, more and more cases have been reported where advantage is taken of the presence of reactive groups to form a graft or a block or a random copolymer, which could act as a compatabilizer for a mixture of two or more polymers. The prior art, *Process Requirements of the Reactive Compatibilization of Nylon 6/Polypropylene Blends* by S. S. Dagli, M. Xanthos and J. A. Biensenberger: Polymer Processing Institute at Stevens Institute of Technology, Hoboken, N.J. 07030 reveals an acrylic acid grafted modified polypropylene used with a blend of nylon-6 and polypropylene.

Thermoplastic resin compositions containing polypropylene are well known in the art (e.g. U.S. Pat. No. 5,208,081). U.S. Pat. No. 5,179,164 describes a polypropylene/polyamide composition suitable for producing moldings. The patent describes an ethylene copolymer useful as an adhesion promoter. Moreover, the patent indicates that maleic acid is a suitable monomer for preparing the ethylene copolymer.

In addition, maleated polypropylene is commercially available.

European patent application 0 367 832 discloses a resin composition containing an olefinic polymer having acid anhydride groups. As in U.S. Pat. No. 5,179,164, the novel compound is blended with a polyamide.

Japanese patent 46003838 reveals a maleic anhydride modified polypropylene composition containing triethylamine and polyethylene glycol nonylphenyl ether. Japanese patent 60195120 reveals a molding containing polyethylene, maleic anhydride-grafted polyethylene, and diethylenetriamine.

However, the instant invention uses the maleic anhydride in conjunction with polyetheramines which produce unexpected improvements in resin properties.

SUMMARY OF THE INVENTION

This invention is a compound comprising a blend of polypropylene with the reaction product of a functionalized polypropylene and polyether amine in which the polyether amine is grafted onto the functionalized polypropylene in a customary mixing apparatus. This invention is also a process for producing the reaction product of the functionalized polypropylene and the polyether amine by melting with polypropylene in a customary mixing apparatus.

DESCRIPTION OF THE PREFERRED EMBODIMENT

The blend of polypropylene with the reaction product of maleated polypropylene and polyether amine shows improved paintability, improved impact resistance, and excellent mold flowability over blends of polypropylene and the reaction product of polypropylene and maleated polypropylene.

Plastics are increasingly being employed in the production of motor vehicles. Impact-modified PP (polypropylene) has proved to be particularly suitable for applications such as bumpers, spoilers, fenders, side bump strips and the like. Therefore, a thermoplastic resin blend having the improved properties of the instant invention has significant potential commercial usefulness.

These resin compositions, according to the present invention, are useful as engineering plastics which are materials for structural members in the fields of transport machines (automobiles, ships and the like), apparatus, tools, electronic appliances, electric appliances, sporting goods, leisure goods and the like; and for connectors, tubes and the like.

Suitable polypropylenes are known from polymer chemistry, are described for example in Kunststoff-Handbuch, volume IV, Polyolefine, edited by R. Vieweg, A. Schley and A. Schwarz. Carl Hanser Verlag, Munich, 1969, and are commercially available, so that no details need be given.

Functionalized PP is PP onto which a monomer has been grafted. The usual method of such grafting is by free radical reaction. Suitable monomers for preparing functionalized polypropylene are for example olefinically unsaturated monocarboxylic acids, e.g. acrylic acid or methacrylic acid, and the corresponding tert-butyl esters, e.g. tert-butyl (meth) acrylate, olefinically unsaturated dicarboxylic acids, e.g. fumaric acid, maleic acid, and itaconic acid and the corresponding mono- and/or di-tert-butyl esters, e.g. mono- or di-tert-butyl fumarate and mono- or di-tert-butyl maleate, olefinically unsaturated dicarboxylic anhydrides, e.g. maleic anhydride, sulfo- or sulfonyl-containing olefinically unsaturated monomers, e.g. p-styrenesulfonic acid, 2-(meth) acrylamido-2-methylpropenesulfonic acid or 2-sulfonyl (meth)acrylate, oxazolinyl-containing olefinically unsaturated monomers, e.g. vinyloxazolines and vinyloxazoline derivatives, and epoxy-containing olefinically unsaturated monomers, e.g. glycidyl (meth)acrylate or allyl glycidyl ether.

Suitable maleated polypropylene include the following structures:

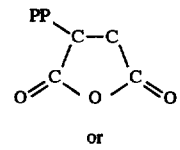

or

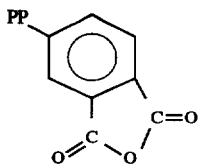

wherein PP is polypropylene.

Suitable polyether blocks for the polyetheramine include polyethylene glycol, polypropylene glycol, copolymers of polyethylene glycol and polypropylene glycol, poly(1,2-butylene glycol), and poly(tetramethylene glycol).

Suitable polyetheramines include monamines, diamines and triamines, having a molecular weight of from about 150 to 12,000. Suitable monoamines include the polyetheramines sold by Huntsman Corporation under the trademarks JEFFAMINE® M-1000, JEFFAMINE® M-2070, and JEFFAMINE® M-2005. Suitable diamines include the polyetheramines sold by Huntsman Corporation under the trademarks JEFFAMINE® ED-6000, JEFFAMINE® ED-4000, JEFFAMINE® D-2001, JEFFAMINE® D-2000, JEFFAMINE® D-4000, JEFFAMINE® ED-900, JEFFAMINE® ED-600, and JEFFAMINE® D-400. Suitable triamines include the polyetheramines sold by Huntsman Corporation under the trademarks JEFFAMINE® ET-3000, JEFFAMINE® T-3000 and JEFFAMINE® T-5000. A glossary of jeffamine structures is set forth at Table 4.

The mixing of the functionalized polypropylene and polyetheramine may be carried out in a customary mixing apparatus including batch mixers, continuous mixers, kneaders, and extruders.

Besides the PP/functionalized-PP/polyetheramine structural components according to the invention, the resin composition may, to improve the impact strength, contain impact modifiers, advantageously impact-modifying elastomers. Impact-modifying elastomers for the instant invention are known to a skilled worker. Examples are rubbers based on ethylene, propylene, butadiene, and acrylates, e.g. methacrylates, or mixtures thereof.

Suitable impact-modifying elastomers are described for example in Methoden der organischen Chemie (Houben-Weyl), volume XIV/1, Makromolekulare Chemie (Georg-Thieme-Verlag, Stuttgart, 1961), pages 390 to 406, and in the monograph by C. B. Bucknal, Toughened Plastics (Applied Publishers, London, 1977).

In addition to the structural components of PP, functionalized-PP, and polyetheramine and any impact modifier contained in a resin composition according to the instant invention, the resin may also contain reinforcing agents and/or additives. The reinforcing agents used may be reinforcing fillers, for example asbestos, carbon or carbon fibers, clay, talc, mica, glass (beads or fibers), and chalk which may be finished with adhesion promoters and/or sizes.

The preferred functionalized polypropylene is a maleated polypropylene having the following structure:

$$PP\diagdown\underset{O}{\underset{\|}{C}}\diagup\underset{O}{\overset{C-C}{\diagdown}}\underset{\|}{\overset{}{C}}\diagup O$$

wherein PP is polypropylene.

The preferred monoamines as well as the preferred triamines have a molecular weight of from about 200 to 4000. The preferred diamines have a molecular weight of from about 148 to 6000.

The preferred reaction product between the preferred functionalized polypropylene, maleated polypropylene, and the preferred polyetheramine has the following formula:

[structural formula]

wherein a is from about 5 to 50,000, for b:c from about 0:100 to 100:0, x is from about 1 to 3, and R is an alkyl radical having valence of x.

Suitable thermoplastic resin compositions may contain from about 66 to 80 wt % PP, from about 20 to 30 wt % maleated PP and from about 2 to 10 wt % polyetheramine.

The preferred customary mixing apparatus is an extruder in which the polyetheramine is grafted onto the maleated polypropylene at from about 175° to 300° C. in the course of a residence time of from about 25 to 300 seconds. Polypropylene is a non-reactive component of the mixing blend. The preferred temperature range is from about 190° to 260° C.

Continuous compounding was carried out in a Werner & Pfleiderer 30 mm twin screw extruder (ZSK30) in which the feed sequence was a combined feed in which all the components fed at the same location (hopper of the extruder).

The following examples which illustrate the nature of the instant invention are not intended to be limitative.

EXAMPLE 1–6

Blends of PP, maleated PP (MAL-PP), and JEFFAMINE® M2070 polyetheramine produced in an extruder exhibit characteristics in percent compositions as shown in Table 1 in which the remaining percent is PP:

TABLE 1

| Example | 1 | 2 | 3 | 4 | 5 | 6 |
|---|---|---|---|---|---|---|
| % MAL-PP | | 20 | | | 30 | |
| % Polyetheramine | 0 | 2 | 4 | 0 | 2 | 4 |
| FM, psi | 284K | 255K | 226K | 289K | 256K | 201K |
| StY, psi | 8660 | 7980 | 7030 | 8750 | 7830 | 6170 |
| TE, % | 8 | 16 | 10 | 4 | 13 | 5 |
| TSt, psi | 4990 | 4770 | 4280 | 5000 | 4630 | 3720 |
| NI, ftlb/in | 0.161 | 0.220 | 0.386 | 0.123 | 0.139 | 0.220 |
| UnI, ftlb/in | 12 | 14 | 10 | 10 | 14 | 5 | where:
FM - flexural modulus
StY - stress at yield
TE - Tensile elongation
TSt - tensile strength
NI - notched izod impact
UnI - unnotched izod impact.

EXAMPLES 7–10

Table 2 reveals the effects of JEFFAMINE® M-2070 polyetheramine (M) as compared to JEFFAMINE® ED-2001 polyetheramine (ED) in which either is blended with from about 76 to 78 wt % of PP, and from about 20 wt % of MAL-PP in an extruder.

TABLE 2

| Example | 7 | 8 | 9 | 10 |
|---|---|---|---|---|
| Polyetheramine Type | M | ED | M | ED |
| % Polyetheramine | | 2 | | 4 |
| FM, psi | 255K | 246K | 226K | 230K |
| StY, psi | 7980 | 7730 | 7030 | 7140 |
| TE, % | 16 | 10 | 10 | 16 |
| TSt, psi | 4770 | 4560 | 4280 | 4420 |
| NI, ftlb/in | 14 | 15 | 10 | 18 |
| UnI, ftlb/in | 14 | 15 | 10 | 18 | where:
FM - flexural modulus
StY - stress at yield
TE - Tensile elongation
TSt - tensile strength
NI - notched izod impact
UnI - unnotched izod impact.

EXAMPLES 11–17

Table 3 reveals the percent paint adhesion of various compositions of PP, maleated PP, and the JEFFAMINE® polyetheramines indicated relative to a control sample wherein the blends were produced in an extruder.

TABLE 3

| Example | PP | MAL-PP | Polyetheraime Type | Paint Adhesion | Control |
|---|---|---|---|---|---|
| 11 | 76% | 20% | 4% JEFFAMINE ® M-1000 | 62% | 2% |
| 12 | 76% | 20% | 4% JEFFAMINE ® ED-6000 | 28% | 4% |
| 13 | 74% | 20% | 6% JEFFAMINE ® ED-6000 | 46% | 4% |
| 14 | 74% | 20% | 6% JEFFAMINE ® 4000 | 40% | 4% |
| 15 | 74% | 20% | 6% JEFFAMINE ® M-2070 | 77% | 21% |
| 16 | 72% | 20% | 8% JEFFAMINE ® M-2070 | 40% | 21% |
| 17 | 72% | 20% | 8% JEFFAMINE ® ED-2001 | 68% | 21% |

TABLE 4

GLOSSARY

JEFFAMINE® M-1000 Polyetheramines

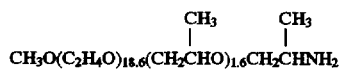

JEFFAMINE® M-2070 and JEFFAMINE® M-2005 Polyetheramines

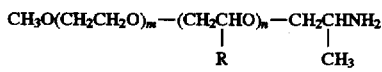

where R=H, $CH_3$, m is from about 3 to 32, and n is from about 10 to 32.

JEFFAMINE® D-2000, JEFFAMINE ® D-4000, and JEFFAMINE® D-400 Polyetheramines

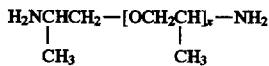

where x is about 33 for D-2000, x is about 68 for D-4000 and x is about 5.6 for D-400.

JEFFAMINE® ED-600, JEFFAMINE® ED-900, JEFFAMINE® ED-2001, JEFFAMINE® ED-4000, and JEFFAMINE® ED-6000 Polyetheramines

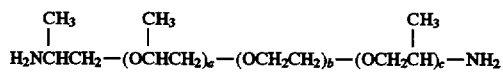

where b is about 8.5 and a+c is about 2.5 for ED-600, b is about 15.5 and a+c is about 2.5 for ED-900, b is about 40.5 and a+c is about 2.5 for ED-2001, b is about 86.0 and a+c is about 2.5 for ED-4000, and b is about 132.0 and a+c is about 3.0 for ED-6000.

JEFFAMINE® T-3000 and JEFFAMINE® T-5000 Polyetheramines

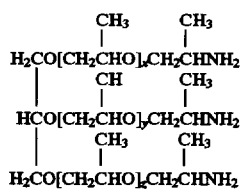

where x+y+z=50 for T-3000 and x+y+z=83 for T-5000.

JEFFAMINE® ET-3000 Polyetheramine

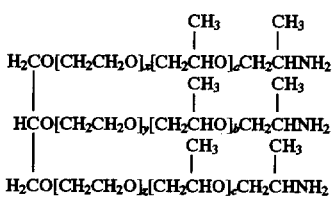

where x+y+z=57 and a+b+c=4.

We claim:

1. A process, comprising compounding component (a) that includes polypropylene with component (b) that includes the reaction product of (i) a polyetheramine and (ii) a polypropylene that has been reacted with a compound selected from the group consisting of: an olefinically unsaturated carboxylic acid; an olenfinically unsaturated carboxylic acid anhydride; and an olenfinically unsaturated carboxylic acid ester, at a temperature of from about 175° C. to about 300° C.

2. The process claim 1, wherein the olefinically unsaturated carboxylic acid is fumaric acid, maleic acid, itaconic acid, acrylic acid, or methacrylic acid.

3. The process of claim 1, wherein the olefinically unsaturated carboxylic acid anhydride is fumaric anhydride, maleic anhydride, itaconic anhydride, acrylic anhydride, or methacrylic anhydride.

4. The process claim 1, wherein the olefinically unsaturated carboxylic acid ester is fumarate, maleate, itaconate, acrylic ester, or methacrylic ester.

5. The process of claim 1, wherein the polyetheramine contains polyether blocks selected from the group consisting of polyethylene glycol, polypropylene glycol, and copolymers of polyethylene glycol and polypropylene glycol.

6. The process of claim 1, wherein the reaction is carded out by melting the components in a customary mixing apparatus in the course of a residence time of from about 25 to 300 seconds.

7. A process, comprising compounding component (a) that includes polypropylene with component (b) that includes the reaction product of (i) a polyetheramine and (ii) a maleated polypropylene, at a temperature of from about 175° C. to about 300° C.

8. A process, comprising compounding in a mixing apparatus:
   (a) polypropylene; and
   (b) the reaction product of (i) a polyetheramine and (ii) a functionalized polypropylene produced by reacting polypropylene with a compound selected from the group consisting of an olefinically unsaturated carboxylic acid, an olefinically unsaturated carboxylic acid anhydride, and an olefinically unsaturated carboxylic acid ester;

to produce a paintable thermoplastic resin.

9. The process of claim 8, wherein the paintable thermoplastic resin produced thereby exhibits paint adhesion of greater than 62%.

10. The process of claim 8, wherein the reaction product is produced in the mixing apparatus in the presence of the polypropylene.

11. The process of claim 10, wherein the weight ratio of the functionalized polypropylene to the polyetheramine used to produce the reaction product is from about 2:1 to about 15:1.

12. The process of claim 10, wherein the weight ratio of the functionalized polypropylene to the polyetheramine used to produce the reaction product is from about 2.5:1 to about 5:1.

13. The process of claim 10, wherein the reaction product is produced at a temperature of from about 175° C. to about 30020 C.

14. The process of claim 10, wherein the polyetheramine is added in an amount of from about 2 to about 10 wt % of the combined polypropylene, functionalized polypropylene, and polyetheramine.

15. The process of claim 8, wherein the functionalized polypropylene is produced by reacting polypropylene with maleic anhydride.

16. The process of claim 8, wherein the polypropylene contains impact modifiers.

17. The process of claim 16, wherein the impact modifiers are impact-modifying elastomers.

18. A process, comprising compounding in a mixing apparatus:
  (a) polypropylene; and
  (b) the reaction product of a polyetheramine and maleated polypropylene;
to produce a paintable thermoplastic resin.

19. The process of claim 18, wherein the reaction product is prepared in the mixing apparatus in the presence of the polypropylene.

20. The process of claim 19, wherein the paintable thermoplastic resin produced thereby exhibits paint adhesion of greater than 68%.

21. The process of claim 20, wherein the reaction product is produced at a temperature of from about 175° C. to about 300° C.

22. The process of claim 21, wherein the polyetheramine is added in an amount of from about 2 to about 10 wt % of the combined polypropylene, functionalized polypropylene, and polyetheramine.

23. The process of claim 18, wherein the polypropylene contains impact modifiers.

24. The process of claim 23, wherein the impact modifiers are impact-modifying elastomers.

* * * * *

UNITED STATES PATENT AND TRADEMARK OFFICE
CERTIFICATE OF CORRECTION

PATENT NO : 5,721,315
DATED : February 24, 1998
INVENTOR(S): Evans et al.

It is certified that error appears in the above-identified patent and that said Letters Patent is hereby corrected as shown below:

In column 5, line 7, delete "Polyetheraime" and insert --Polyetheramine--.

In claim 5, column 6, line 35, delete "carded" and insert --carried--.

In claim 13, column 7, line 3, delete "30020" and insert --300°--.

Signed and Sealed this

Seventh Day of July, 1998

Attest:

BRUCE LEHMAN

Attesting Officer

Commissioner of Patents and Trademarks